US012390898B2

(12) United States Patent
Yeh et al.

(10) Patent No.: US 12,390,898 B2
(45) Date of Patent: Aug. 19, 2025

(54) TOOL HOLDER HAVING FORCE SENSORS

(71) Applicant: Industrial Technology Research Institute, Hsinchu (TW)

(72) Inventors: Chien-Nan Yeh, Tainan (TW); Chung-Yuan Su, Tainan (TW); Chao-Ta Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 490 days.

(21) Appl. No.: 18/089,257

(22) Filed: Dec. 27, 2022

(65) Prior Publication Data

US 2023/0201988 A1 Jun. 29, 2023

(30) Foreign Application Priority Data

Dec. 29, 2021 (TW) ................................ 110149453

(51) Int. Cl.
*B23Q 17/09* (2006.01)
*B23B 49/00* (2006.01)

(52) U.S. Cl.
CPC .......... *B23Q 17/0966* (2013.01); *B23B 49/00* (2013.01); *B23B 2260/128* (2013.01)

(58) Field of Classification Search
CPC ................................................. B23Q 17/0966
See application file for complete search history.

(56) References Cited

U.S. PATENT DOCUMENTS

| 4,899,594 | A | 2/1990 | Wolfer |
| 8,113,066 | B2 | 2/2012 | Eckstein |
| 2002/0036091 | A1 | 3/2002 | Claesson |
| 2009/0234490 | A1* | 9/2009 | Suprock ................ B23B 31/02 408/116 |

(Continued)

FOREIGN PATENT DOCUMENTS

| CN | 106181578 A | 12/2016 |
| CN | 107414599 A | 12/2017 |

(Continued)

OTHER PUBLICATIONS

Teti et al. "Advanced monitoring of machining operations" Dec. 2010, ResearchGate.

(Continued)

*Primary Examiner* — Nathan L Laughlin
(74) *Attorney, Agent, or Firm* — WPAT, PC

(57) ABSTRACT

A tool holder having force sensors includes a first connection portion, a second connection portion, a first sensing portion, a second sensing portion, at least one first force sensor and at least one second force sensor. The first connection portion connects a cutting tool along an axis. The second connection portion connects a spindle along the axis. The first sensing portion having at least one first hole connects the first connection portion along the axis. The second sensing portion having at least one second hole connects the second connection portion and the first sensing portion. The first force sensor disposed in the first hole is to sense a torsional force. The second force sensor disposed in the second hole is to sense a bending force. The first sensing portion has a bending stiffness greater than that of the second sensing portion.

16 Claims, 10 Drawing Sheets

(56) References Cited

U.S. PATENT DOCUMENTS

| | | | |
|---|---|---|---|
| 2009/0235763 A1* | 9/2009 | Eckstein | G01L 5/0076 |
| | | | 73/862.321 |
| 2018/0178293 A1* | 6/2018 | Yamamoto | B23G 5/00 |
| 2018/0311779 A1 | 11/2018 | Ziegltrum | |
| 2019/0001456 A1 | 1/2019 | Kalhori | |
| 2021/0114156 A1 | 4/2021 | Bleicher | |
| 2022/0032416 A1* | 2/2022 | Fimpel | B23B 25/06 |
| 2022/0097192 A1* | 3/2022 | Nishikawa | B23Q 17/0995 |
| 2022/0193789 A1* | 6/2022 | Gonzalez Gillis | B23B 29/04 |

FOREIGN PATENT DOCUMENTS

| | | |
|---|---|---|
| CN | 109357848 A | 2/2019 |
| CN | 110695766 | 1/2020 |
| CN | 113770811 A | 12/2021 |
| DE | 102014103240 A1 | 10/2015 |
| TW | 201302375 | 1/2013 |
| TW | 201816383 A | 5/2018 |
| TW | 201817538 | 5/2018 |
| TW | I651152 B | 7/2019 |

OTHER PUBLICATIONS

Taiwan Patent Office "Office Action" issued on Nov. 30, 2022, Taiwan.

Xie et al. "Development and testing of an integrated smart tool holder for four-component cutting force measurement", pp. 225-240, 2017, Elsevier.

* cited by examiner

TOOL HOLDER HAVING FORCE SENSORS

CROSS REFERENCE TO RELATED APPLICATION

This application claims the benefits of Taiwan application Serial No. 110149453, filed on Dec. 29, 2021. The entirety of the above-mentioned patent application is incorporated by references herein.

TECHNICAL FIELD

The present disclosure relates a tool holder having force sensors.

BACKGROUND

In order to meet the demands of Industry 4.0 and high-end products (such as aerospace products and automobiles), global machine tool manufacturers have invested massive resources in the research and development of related technologies. Therefore smart machine tools equipped with working status detection, sensing data analysis capabilities, and aging prediction capabilities will be the trend of future developments.

Although the existing machine tool can be equipped with multiple sensors to detect stress situation of the handle of the machine tool. However, these sensors may simultaneously detect multi-axial forces, such as torsional force and bending force, and thus coupling effects of the multi-axial forces may occur. The aforesaid coupling effects cause some sensors to not accurately detect the stress on various parts of the tool holder of the machine tool, which significantly reduces the sensing performance of these sensors.

SUMMARY

In one embodiment of this disclosure, a tool holder having force sensors comprises a first connection portion, a second connection portion, a first sensing portion, a second sensing portion, at least one first force sensor and at least one second force sensor. The first connection portion connects a cutting tool along an axis. The second connection portion is connected to a spindle along the axis. The first sensing portion has at least one first hole and is connected to the first connection portion along the axis. The second sensing portion has at least one second hole and is connected to the second connection portion and the first sensing portion along the axis. The at least one first force sensor is disposed in the at least one first hole and is configured to sense a torsional force. The at least one second force sensor is disposed in the at least one second hole and is configured to sense a bending force. A second bending stiffness of the second sensing portion is less than a first bending stiffness of the first sensing portion.

In another embodiment of this disclosure, a tool holder having force sensors comprises a first connection portion, a second connection portion, a first sensing portion, a second sensing portion, at least one first force sensor and at least one second force sensor. The first connects a cutting tool along an axis. The second connection portion is connected to a spindle along the axis. The first sensing portion has at least one first hole and is connected to the first connection portion along the axis. The second sensing portion has at least one second hole and is connected to the second connection portion and the first sensing portion along the axis. The at least one first force sensor is disposed in the at least one first hole and is configured to sense a torsional force. The at least one second force sensor is disposed in the at least one second hole and is configured to sense a bending force. A first torsional stiffness of the first sensing portion is less than a second torsional stiffness of the second sensing portion.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure.

DETAILED DESCRIPTION

Figure 1:
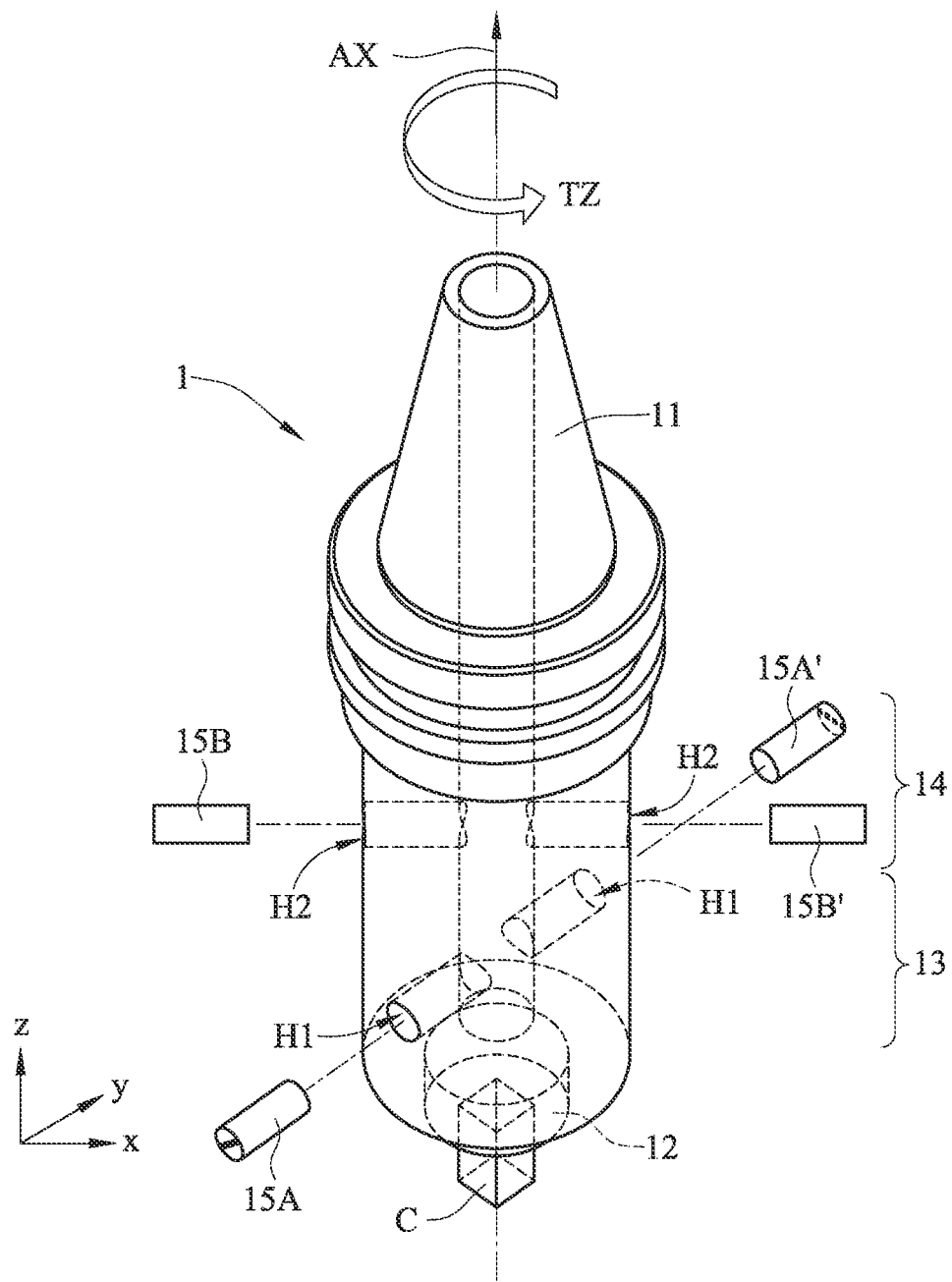
FIG. 1 is a schematic perspective view of a first embodiment of the tool holder having force sensors in accordance with this disclosure.

Below, exemplary embodiments will be described in detail with reference to accompanying drawings, so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Referring to FIG. 1, a first embodiment of the tool holder 1 having force sensors in accordance with this disclosure is schematically shown. In this embodiment, the tool holder 1 having force sensors includes a first connection portion 12, a second connection portion 11, a first sensing portion 13, a second sensing portion 14, two first force sensors 15A, 15A' and two second force sensors 15B, 15B'.

The first connection portion 12 connects a cutting tool C along an axis AX, in which the axis AX is the central axis of the tool holder 1.

The second connection portion 11 is connected to a spindle of a machine tool (not shown in the figure) along the axis AX.

The first sensing portion 13 connects the first connection portion 12 along the axis AX. In this embodiment, the first sensing portion 13 has two first holes H1. The two first force sensors 15A, 15A' are disposed in the two first holes H1, respectively.

One end of the second sensing portion 14 connects the second connection portion 11 along the axis AX, while the other end thereof connects the first sensing portion 13 along the axis AX. In this embodiment, the second sensing portion 14 has two second holes H2, and the two second force sensors 15B, 15B' are disposed in these two second holes H2, respectively. In one embodiment, any of the first force sensors 15A, 15A' and any of the second force sensors 15B, 15B' can be, but not limited to, a piezoelectric sensor, a crystal sensor, a strain gauge, or any kind of force sensor.

The first sensing portion 13 is a torsional force sensing portion. The two first force sensors 15A, 15A', respectively disposed in their corresponding first holes H1, are configured to sense torsional force applied to the tool holder 1. The second sensing portion 14 is a bending sensing portion. The two second force sensors 15B, 15B', respectively disposed in their corresponding second holes H2, are configured to sense bending force applied to the tool holder 1.

A second bending stiffness of the second sensing portion 14 is less than a first bending stiffness of the first sensing portion 13. In other words, the first bending stiffness of the first sensing portion 13 is greater than the second bending stiffness of the second sensing portion 14. The aforesaid first bending stiffness is defined as the bending moment required for the first sensing portion 13 to generate per unit curvature.

Similarly, the aforesaid second bending stiffness is defined as the bending moment required for the second sensing portion 14 to generate per unit curvature. To a beam structure, the aforesaid bending stiffness can be a product of the Young's modulus and the moment of inertia. In addition, a first torsional stiffness of the first sensing portion 13 is less than a second torsional stiffness of the second sensing portion 14. In other words, the second torsional stiffness of the second sensing portion 14 is greater than the first torsional stiffness of the first sensing portion 13. The aforesaid first torsional stiffness is defined as the torque required for the first sensing portion 13 to generate per unit angle of twist. Similarly, the aforesaid second torsional stiffness is defined as the torque required for the second sensing portion 14 to generate per unit angle of twist. The aforesaid angle of twist is an angle in radian.

Based on the aforementioned two sensing portions of different stiffness, the present invention reduces the interference to the two first force sensors 15A, 15A' of the first sensing portion 13 when a torsional force is applied to the tool holder 1. Similarly, any interference to the two second force sensors 15B, 15B' of the second sensing portion 14 is also reduced when a bending force is applied to the tool holder 1. Thus, in this embodiment with sensing portions of different stiffness, as the torsional force and the bending force are sensed by the first sensing portion 13 and the second sensing portion 14 simultaneously, the coupling effects to the first sensing portion 13 and the second sensing portion 14 can be effectively reduced. Accordingly, the measurement accuracy of the first force sensors 15A, 15A' and the second force sensors 15B, 15B' can be significantly improved.

Figure 2A:
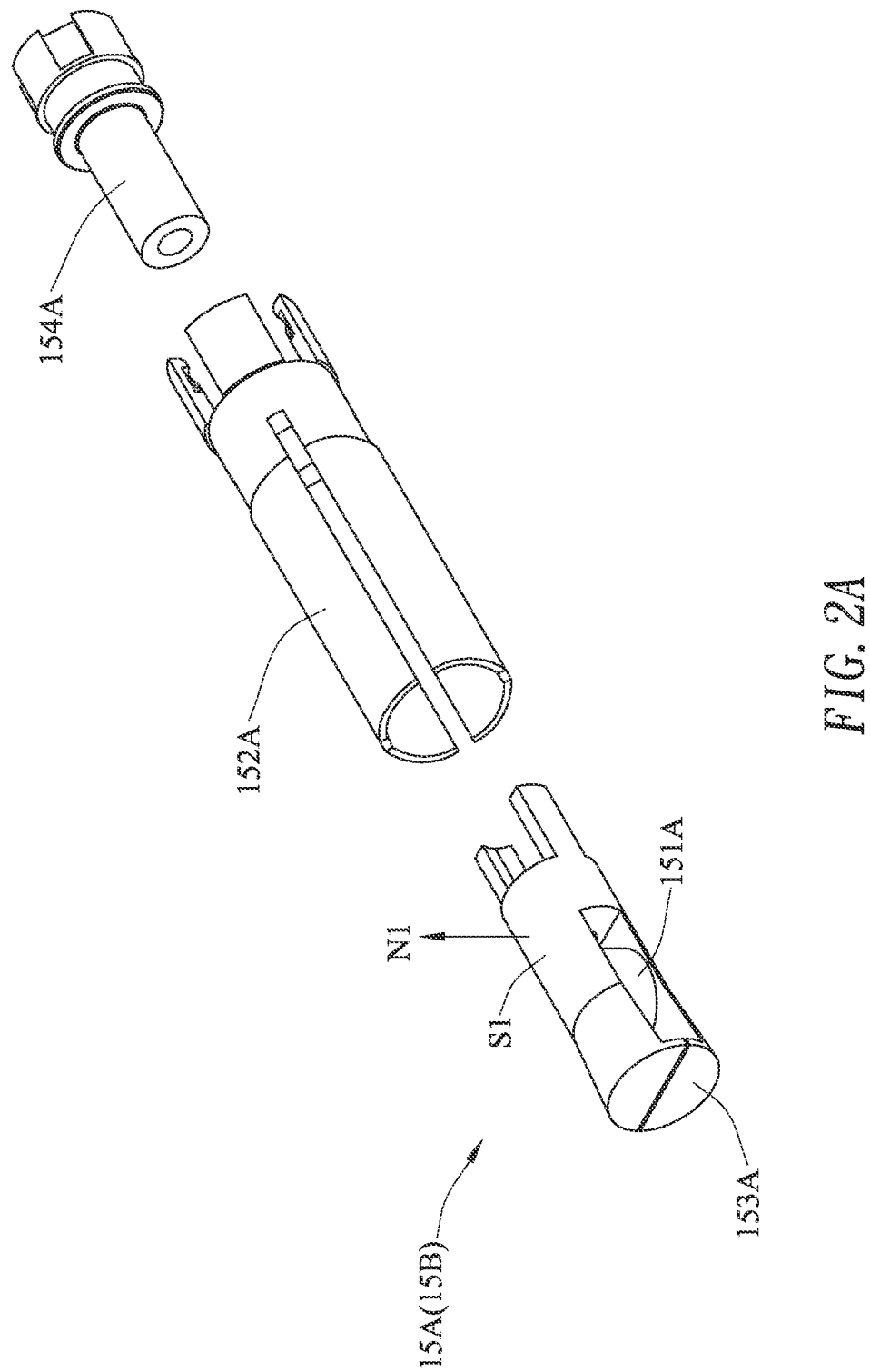
FIG. 2A is a schematic exploded view of the first force sensor of FIG. 1.
Figure 2B:
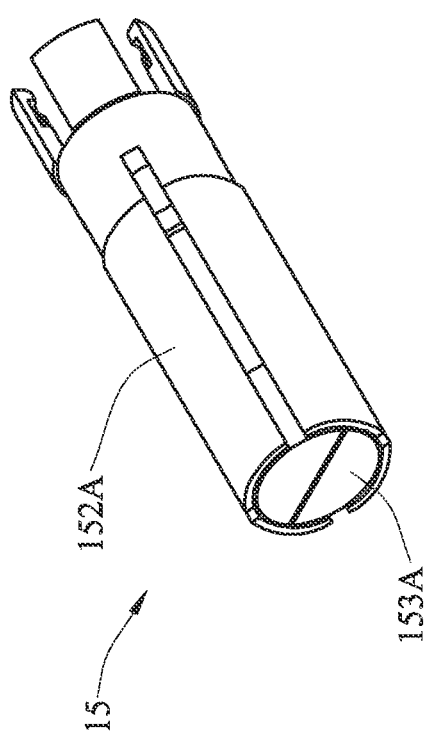
FIG. 2B is a schematic perspective view of the first force sensor of FIG. 1.

Referring to FIG. 2A and FIG. 2B, an exploded view and an assembled view of the first force sensor 15A are schematically shown, respectively. As shown in FIG. 2A, the first force sensor 15A includes a first sensing element 151A, a first shell 152A, an elastic base 153A and a fixing screw 154A.

As shown in FIG. 2A and FIG. 2B, the first sensing element 151A is disposed in the elastic base 153A. The elastic base 153A is disposed in the first shell 152A, such that one end of the elastic base 153A is exposed from the first shell 152A and the other end of the elastic base 153A is fixed by the fixing screw 154A. The first sensing element 151A that is disposed in the elastic base 153A, has a first sensing surface S1. In this embodiment, the first force sensor 15A is a piezoelectric sensor, while the first sensing element 151A is a piezoelectric plate. In another embodiment, the first force sensor 15A can be a crystal sensor, a strain gauge or one of other existing force sensors. In this embodiment, the first force sensor 15A', and the second force sensors 15B, 15B' have identical elements and identical assembling methods of the first force sensor 15A, so details thereabout would be omitted herein.

The aforesaid embodiments of the force sensors may be considered as exemplars only. These force sensors may be made in various modifications and variations without departing from the scope or spirit of the disclosure.

Figure 3A:
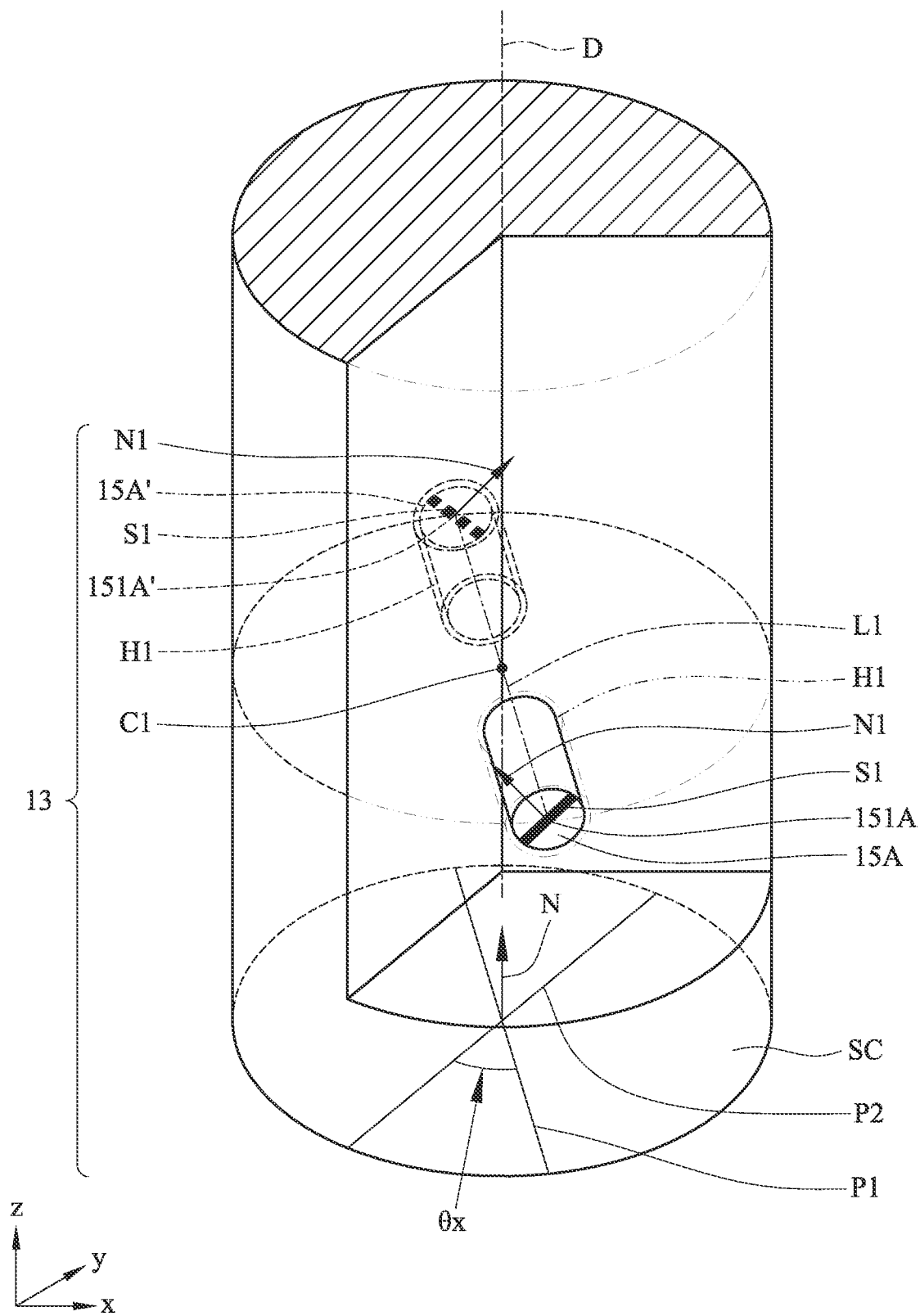
FIG. 3A shows schematically the first sensing portion of FIG. 1.
Figure 3B:
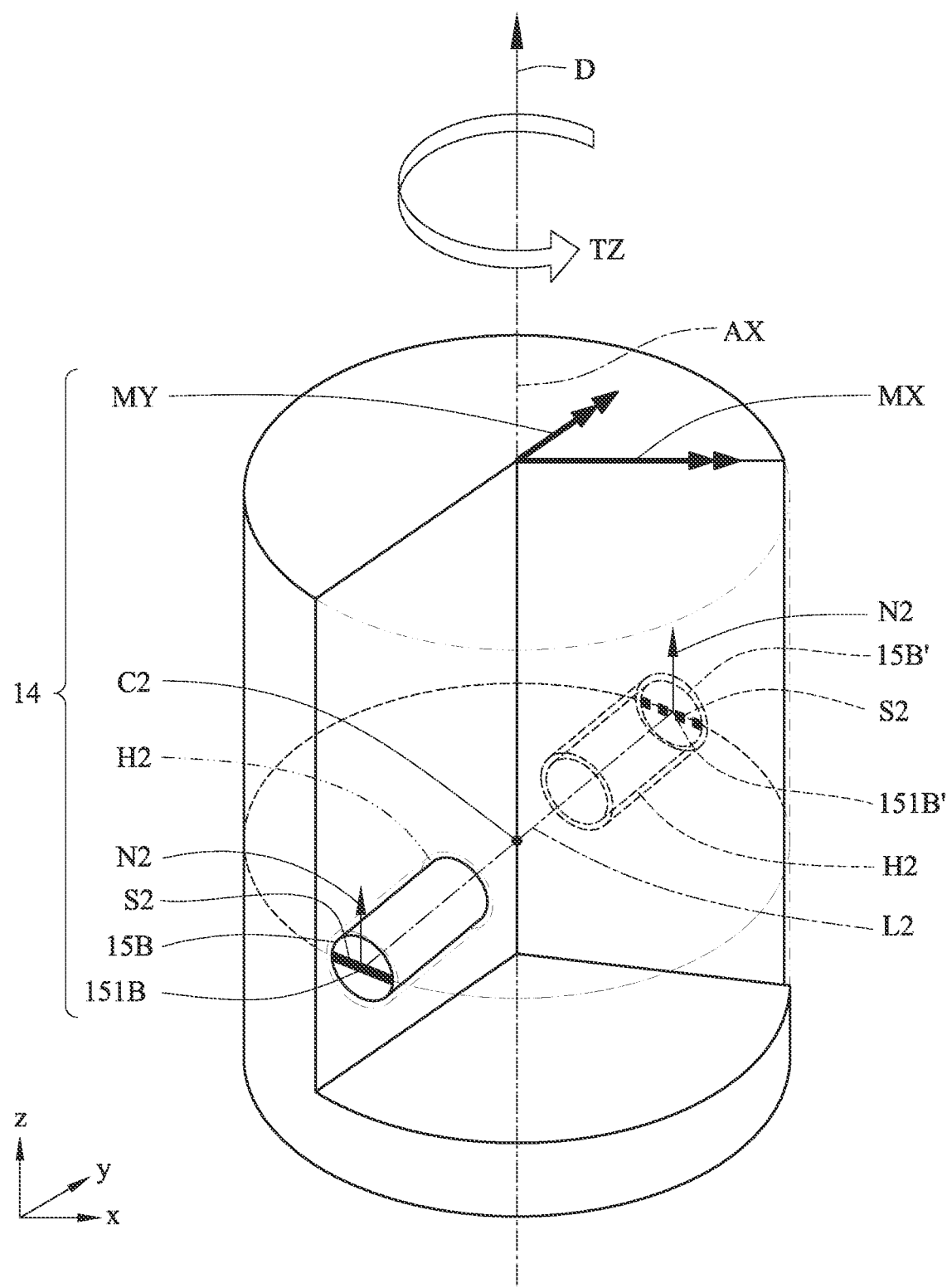
FIG. 3B shows schematically the second sensing portion of FIG. 1.
Figure 4A:
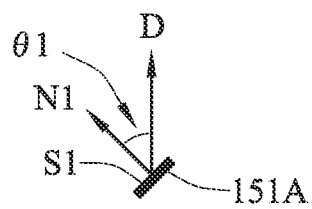
FIG. 4A shows schematically the first force sensor of FIG. 3A.
Figure 4B:
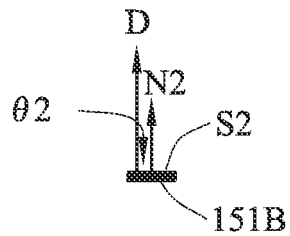
FIG. 4B shows schematically the second force sensor of FIG. 3B.

Referring to FIG. 3A and FIG. 3B, the simplified schematic views of the first sensing portion 13 and the second sensing portion 14 of the tool holder 1 of FIG. 1 are shown, respectively. FIG. 4A and FIG. 4B show simplified schematic views of configuring the first force sensor and the second force sensor, respectively. As shown in FIG. 3A, the first sensing portion 13 includes two first holes H1. As L1 passes through the two first holes H1 and is perpendicular to the axis AX at a first intersection point C1. Therefore, the two first force sensors 15A, 15A', respectively disposed in the two first holes H1, are symmetrically arranged in the first sensing portion 13 with respect to the first intersection point C1 (referred as the symmetric point by the two first force sensors 15A, 15A').

As shown in FIG. 3B, the second sensing portion 14 includes two second holes H2. The second line L2 passes through the two second holes H2 and is perpendicular to the axis AX at a second intersection point C2. Therefore, the two second force sensors 15B, 15B', respectively disposed in the two second holes H2, are symmetrically arranged in the second sensing portion 14, with respect to the second intersection point C2 (referred as the symmetric point by the two second force sensors 15B, 15B'), such that the two second force sensors 15B, 15B' are point-symmetrical.

The first sensing portion 13 has a cross section SC with a normal vector N parallel to the axis AX. The first line L1 forms a first projection P1 on the cross section SC of the first sensing portion 13, and the second line L2 forms a second projection P2 on the cross section SC of the first sensing portion 13.

A projection angle θx is formed between the first projection P1 and the second projection P2. In an embodiment of this disclosure, the projection angle θx can be ranged between −45° and +45°. For example, in this embodiment, the projection angle θx between the first projection P1 and the second projection P2 is substantially equal to +45°.

The bending force is a force which would applies bending moment to the tool holder 1. As shown in FIG. 3B, when a bending moment MX with respect to an axial direction X or a bending moment MY with respect to an axial direction Y applies to the tool holder 1 of this embodiment whose the projection angle θx between the first projection P1 and the second projection P2 is substantially equal to +45°, the second sensing elements 151B, 151B' would sense the maximum bending strain and the first sensing elements 151A, 151A' would sense the minimum bending strain at this moment. In details, when a bending moment MX with respect to the axial direction X (or bending moment MY with respect to the axial direction Y) and a torsional force with respect to the axial direction D of the axis AX simultaneously applies to the tool holder 1 of this embodiment, the ratio of bending strain to the first total strain measured by the first sensing elements 151A, 151A' would be minimum. Thus, when the projection angle θx between the first projection P1 and the second projection P2 is substantially equal to +45°, the bending strain coupled to the measurement of the first sensing elements 151A, 151A' would be reduced. Thereupon, the coupling effect induced by the several multi-forces (for example, torsional force and bending force) in diffident axes would be reduced.

In another embodiment, the projection angle θx between the first projection P1 and the second projection P2 can be substantially equal to −45°. Furthermore, in another embodiment, the projection angle θx can be ranged between −135° and +135°, or be substantially equal to −135° or +135°.

As shown in FIG. 4A, a first sensing angle θ1 is formed between the first normal vector N1 of the first sensing surface S1 of the first sensing element 151A,151A' and the axial direction D of the axis AX. In an embodiment of this disclosure, the first sensing angle θ1 can be ranged between −45° and +45°. For example, in this embodiment, the first sensing angle θ1 can be substantially equal to +45° or −45°.

In addition, a second sensing angle θ2 is formed between the second normal vector N2 of the second sensing surface S2 of the second sensing element 151B, 151B' and the axial direction D of the axis AX. In an embodiment of this disclosure, the first sensing angle θ1 is substantially not equal to the second sensing angle θ2. In the embodiment shown in FIG. 4B, the second sensing angle θ2 can be substantially equal to 0° or 180°. In another embodiment, the second sensing angle θ2 may be greater or less than 0°.

As shown in FIG. 3A, FIG. 3B, FIG. 4A and FIG. 4B, in this embodiment, the first sensing angle θ1 can be substantially equal to +45° or −45°. Thus, when a torsional force TZ with respect to the axial direction D of an axis AX applies to the tool holder 1, the normal direction N1 of the first sensing surface S1 of the first sensing element 151A would be regard to the direction for the maximum torsional strain. Thus, when the first sensing angle θ1 is substantially equal to +45° or −45°, the torsional strain measured by the first sensing element 151A would be the maximum. Thereupon, when the first force sensor 15A measures the torsional force TZ, the measurement sensitivity can be effectively improved.

Similarly, when the first sensing angle θ1 between the first normal vector N1 of the first sensing surface S1 of the first sensing element 151A' and the axial direction D of an axis AX is +45° or −45°, the direction of the first sensing surface S1 would be regard to the direction for the maximum torsional strain. As such, the torsional strain measured by the first sensing element 151A' would also be maximum. Therefore, when the first force sensor 15A' senses the torsional force TZ, the measurement sensitivity can be effectively improved. In addition, since the first force sensor 15A and the first force sensor 15A' are disposed symmetrically with respect to the first intersection point C1, thus these two first force sensors 15A, 15A' can sense the forces applied to the entire tool holder 1 to improve the sensing efficiency.

In this embodiment, the second sensing surface S2 of the second sensing element 151B, 151B' has a second normal vector N2 parallel to the axial direction D of an axis AX. In other words, the second sensing angle θ2 formed between the second normal vector N2 and the axial direction D of an axis AX is substantially equal to 0°. When a bending moment MX with respect to the axial direction X or a bending moment MY with respect to the axial direction Y applies to the tool holder 1 of this embodiment, the direction of the second sensing surface S2 of the second sensing element 151B, 151B' would be regard to the direction for the maximum bending strain. Hence, when the two second force sensors 15B, 15B' is used to measure the bending moments MX with respect to the axial direction X or the bending moments MY with respect to the axial direction Y, the measurement sensitivity of the second sensing element 151B, 151B' can be improved. In addition, since these two second force sensors 15B, 15B' are disposed symmetrically with respect to the second intersection point C2, thus these two second force sensors 15B, 15B' would sense the forces applied to the entire tool holder 1 to improve the sensing efficiency.

In this embodiment, since the projection angle θx between the first projection P1 and the second projection P2 can be substantially equal to +45°, the direction of the first sensing surface S1 of each of the first force sensors 15A, 15A' would be regard to the direction for the maximum torsional strain, and the direction of each of the second sensing surface S2 of the second force sensors 15B, 15B' would be regard to the direction for the maximum bending strain. More precisely, when a torsional force TZ applies to the tool holder 1, the first torsional force measurement of the two first force sensors 15A, 15A' would be larger than the second torsional force measurement of the two second force sensors 15B, 15B'. When a bending moment MX with respect to the axial direction X or a bending moment MY with respect to an axial direction Y applies to the tool holder 1, the first bending measurement of the two first force sensors 15A, 15A' would be smaller than the second bending measurement of the second force sensors 15B, 15B'. Thus, when the projection angle θx between the first projection P1 and the second projection P2 is substantially equal to +45°, the coupling effect to the first force sensors 15A, 15A' and the second force sensors 15B, 15B' can be further reduced. In order to effectively measure the multi-forces applied on the tool holder 1, when the first force sensors 15A, 15A' are disposed in the corresponding first holes H1, and the second force sensors 15B, 15B' are disposed in the corresponding second holes H2, the foresaid first sensing angle θ1 and second sensing angle θ2 can be adjusted accordingly.

In this disclosure, at least one display device (not shown in the figure) can be used to show the measured torsional force and measured bending moment of the two first force sensors 15A, 15A' and the two second force sensors 15B, 15B'. In addition, through wireless communication, the first force sensors 15A, 15A' and the second force sensors 15B, 15B' can transmit the measured data in real time to a data processing platform in a mobile device such as a tablet computer, a mobile phone or a notebook computer.

In addition, quantities of the force sensors 15A, 15A' and quantities of the second force sensors 15B, 15B' can be increased or decreased in accordance with practical requirements. For example, in another embodiment, the first sensing portion 13 can have only one first force sensor 15A for sensing the torsional force TZ while the cutting tool rotates clockwise or counter clockwise.

Figure 5:
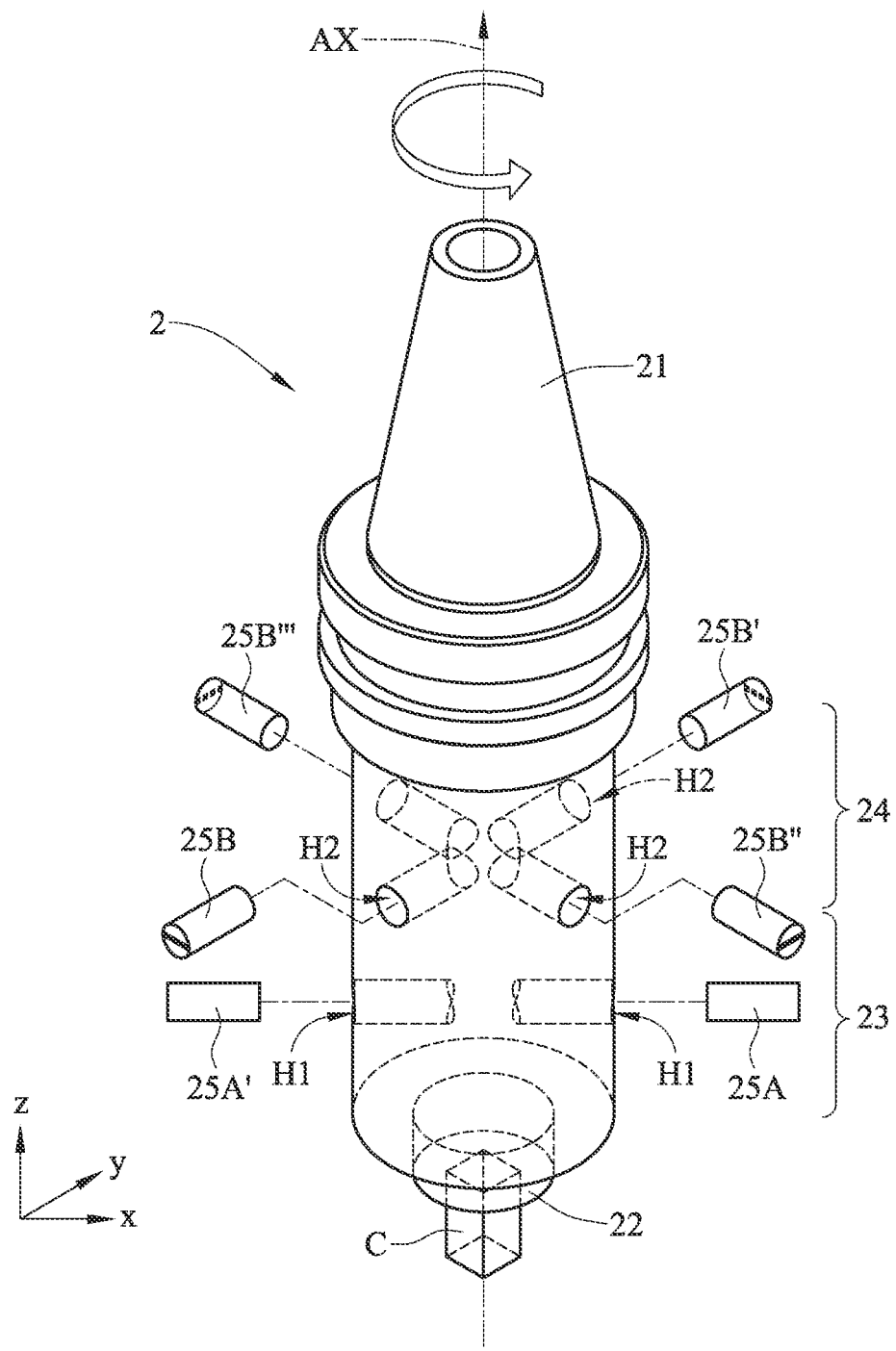
FIG. 5 is a schematic view of a second embodiment of the tool holder having force sensors in accordance with this disclosure.

Referring to FIG. 5, a schematic view of a second embodiment of the tool holder 2 having force sensors in accordance with this disclosure is shown. In this embodiment, the tool holder 2 having force sensors includes a first connection portion 22, a second connection portion 21, a first sensing portion 23, a second sensing portion 24, two first force sensors 25A, 25A' and four second force sensors 25B, 25B', 25B", 25B'''.

The first connection portion 22 connects a cutting tool C along an axis AX, in which the axis AX is the central axis of the tool holder 2. The second connection portion 21 is connected to a spindle (not shown in the figure) along the axis AX of the tool holder 2. The first sensing portion 23 connects the first connection portion 22 along the axis AX. The first sensing portion 23 has two first holes H1 and the two first force sensors 25A, 25A' are disposed in the two first holes H1 respectively. One end of the second sensing portion 24 connects the second connection portion 21 along the axis AX, while another end thereof connects the first sensing portion 23 along the axis AX. Different from the aforesaid embodiments, the second sensing portion 24 of the present embodiment has four second holes H2, and four second force sensors 25B, 25B', 25B", 25B''' are disposed in the four second holes H2 respectively. Comparing with the aforesaid first embodiment, the second sensing portion 24 of the present embodiment has more second force sensors 25B, 25B', 25B", 25B'''.

Similarly, the first sensing portion 23 is a torsional force sensing portion. The two first force sensors 25A, 25A', disposed inside the two first holes H1, are configured to sense torsional force applied to the tool holder 2. The second sensing portion 14 is a bending force sensing portion. The four second force sensors 25B, 25B', 25B", 25B''', respectively disposed in the four second holes H2, are configured to sense bending force applied to the tool holder 2. A first bending stiffness of the first sensing portion 23 is greater than a second bending stiffness of the second sensing portion 24, and first torsional stiffness of the first sensing portion 23 is less than a second torsional stiffness of the second sensing portion 24. Thus, when a torsional force applies to the tool holder 2, the first force sensors 25A, 25A' can sense larger torsional strains than that measured by the second force sensors 25B, 25B', 25B", 25B'''. Also, when a bending force applies to the tool holder 2, the second force sensors 25B, 25B', 25B", 25B''' can sense larger bending strains than that measured by the first force sensors 25A, 25A'. Therefore, when a torsional force applies to the tool holder 2, the first force sensors 25A, 25A' can have better measurement sensitivity. And, when a bending force applies to the tool holder 2, the second force sensors 25B, 25B', 25B", 25B''' can have better measurement sensitivity.

More precisely, since tool holder 2 of this embodiment has two sensing portions with different stiffness, thus, when a torsional force and a bending force simultaneously apply on the tool holder 2, the first force sensors 25A, 25A' would sense a first total strain, which includes a first torsional strain and a first bending strain. Since the first sensing portion 23 has a smaller first torsional stiffness and a larger first bending stiffness, thus, a ratio of the first torsional strain to the first total strain would be greater than a ratio of the first bending strain to the first total strain. Thereupon, the coupling effect to the first total strain can be reduced. Furthermore, when the first sensing portion 23 has a smaller first torsional stiffness and a larger first bending stiffness, the first sensing portion 23 can measure the torsional force more accurately.

On the other hand, when a torsional force and a bending force simultaneously apply on the tool holder 2, the second force sensors 25B, 25B', 25B", 25B''' would sense a second total strain, which includes a second torsional strain and a second bending strain. Since the second sensing portion 24 has a larger second stiffness and a smaller second bending stiffness, thus a ratio of the second torsional strain to the second total strain would be smaller than a ratio of the second bending strain to the second total strain. Therefore, the coupling effect in the second total strain can be reduced. Furthermore, when the second sensing portion 24 has a smaller second bending stiffness and a larger second torsional stiffness, the second sensing portion 24 can measure the bending force more accurately.

Figure 6A:
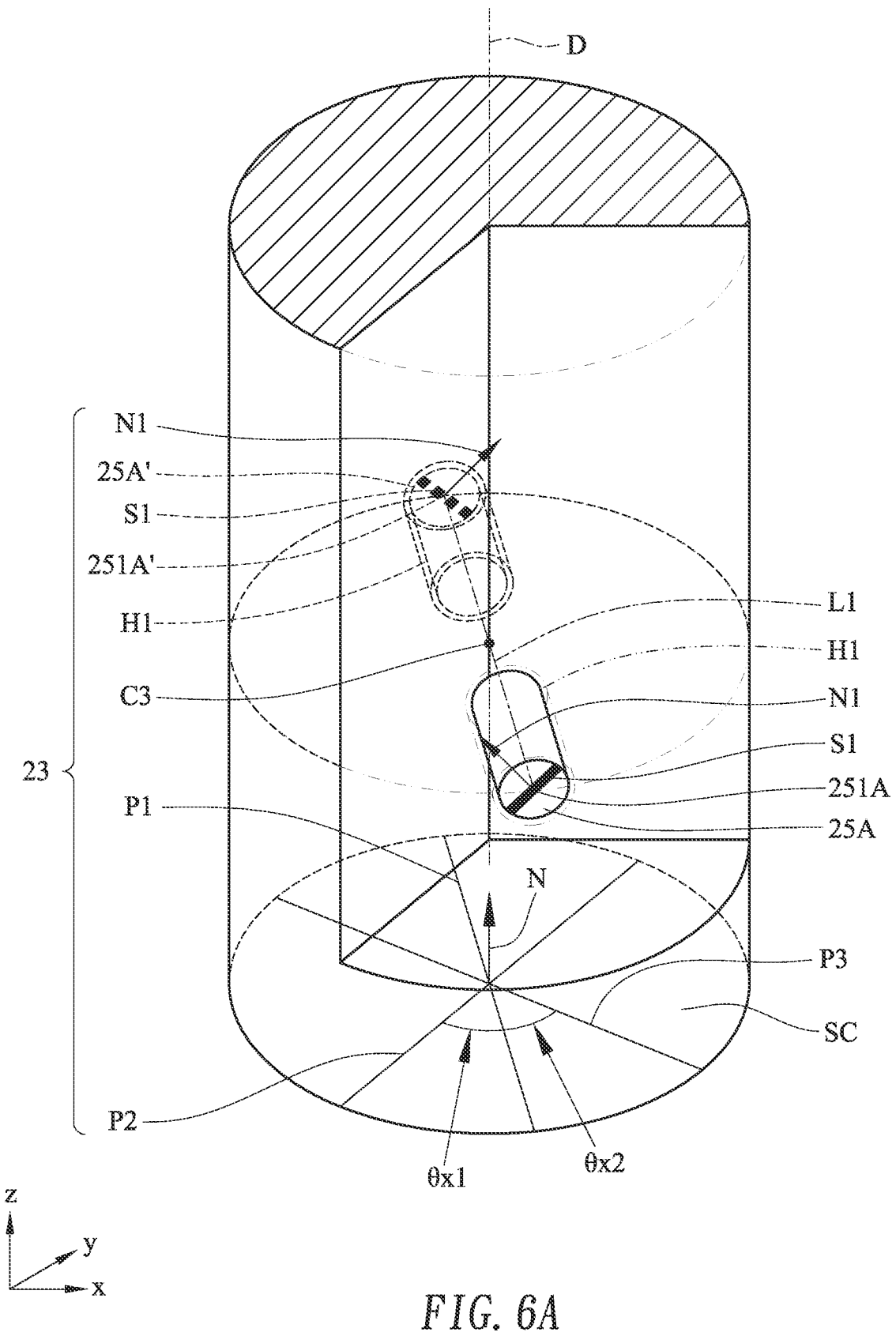
FIG. 6A shows schematically the first sensing portion of FIG. 5.
Figure 6B:
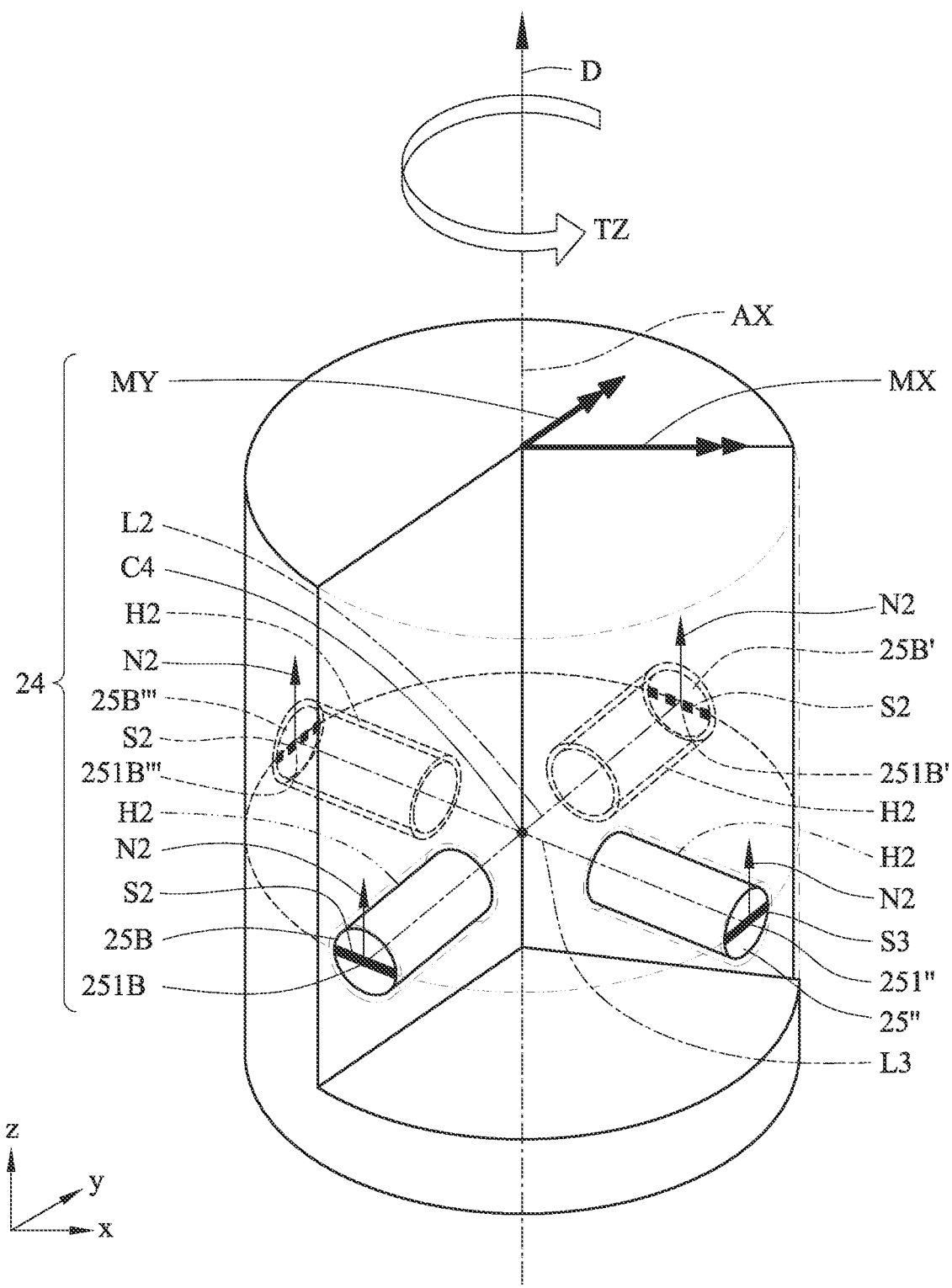
FIG. 6B shows schematically the second sensing portion of FIG. 5.

Referring to FIG. 6A and FIG. 6B, two simplified views of the first sensing portion 23 and the second sensing portion 24 of a second embodiment of the tool holder 2 are schematically shown, respectively. Also, in the embodiments of FIG. 7A and FIG. 7B, arrangements of the first force sensors and the second force sensors are schematically shown, respectively. As shown in FIG. 6A and FIG. 6B, the first sensing portion 23 includes two first holes H1, and a first line L1 passing through the two first holes H1 is intersected with the axis AX at a third intersection point C3. Therefore, the third intersection point C3 is referred as a symmetry point for disposing the two first force sensors 25A, 25A' in the two first holes H1, such that the two first force sensors 25A, 25A' are arranged symmetrically with respect to the third intersection point C3.

The second sensing portion 24 has four second holes H2. A second line L2 passes through two of these four second holes H2 and a third line L3 passes through the other two of these four second holes H2. The second line L2 and the third line are both intersected with the axis AX at a same fourth intersection point C4, in which an angle between the second line L2 and the third line L3 is 90°. Thus, the two second force sensors 25B, 25B' are disposed respectively inside the two second holes H2 passed by the second line L2, and are arranged symmetrically with respect to the fourth intersection point C4, such that the two second force sensors 25B, 25B' are point-symmetrical. In addition, the other two second force sensors 25B", 25B''' are disposed inside the other second holes H2 passed by the third line L3, and are arranged symmetrically with respect to the fourth intersection point C4, such that the two second force sensors 25B", 25B''' are point symmetrical.

The first sensing portion 23 has a cross section SC with a normal vector N parallel to the axial direction D of the axis AX. The first line L1 in FIG. 6A passing through the first holes H1 forms a first projection P1 on the cross section SC. The second line L2 in FIG. 6B and the third line L3 in FIG. 6B passing the second holes H2 form a second projection P2 and a third projection P3 on the cross section SC, respectively.

A projection angle $\theta x1$ is formed between the first projection P1 and the second projection P2, and a projection angle $\theta x2$ is formed between the first projection P1 and the third projection P3. In an embodiment, each of the projection angle $\theta x1$ and the projection angle $\theta x2$ can be an angle between −45° and +45°. In this embodiment, the projection angle $\theta x1$ can be substantially equal to +45°, while the projection angle $\theta x2$ can be substantially equal to −45°.

As shown in FIG. 6B, when a bending moment MX with respect to an axial direction X or another bending moment MY with respect to another axial direction Y applies to the tool holder 2 of this embodiment, and when the projection angle θx1 between the first projection P1 and the second projection P2 is substantially equal to +45°, the second sensing elements 251B, 251B', 251B'', 251B''' would sense the maximum bending strain, and the first sensing elements 251A, 251A' would sense the minimum bending strain. In further detailed, when a bending force with respect to the axial direction X (or with respect to the axial direction Y) and a torsional force with respect to the axial direction D of an axis AX applies to the tool holder 2 of this embodiment, the ratio of bending strain to the first total strain measured by the first sensing elements 251A, 251A' would be minimal. Thus, when the projection angle θx1 between the first projection P1 and the second projection P2 can be substantially equal to +45°, the bending strains which are coupled to first total strain measured by the first sensing elements 251A, 251A', would be reduced. Thereupon, when the tool holder 2 simultaneously measures the multi-forces in several axes (for example, torsional force and bending force), the coupling effect would be reduced.

In another embodiment, each of the projection angle θx1 and the projection angle θx2 can be an angle between −135° and +135°. For example, the projection angle θx1 and the projection angle θx2 can be substantially equal to −135° or +135°, respectively.

Figure 7A:
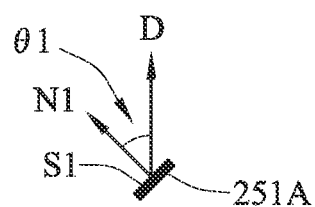
FIG. 7A shows schematically the first force sensor of FIG. 6A.
Figure 7B:
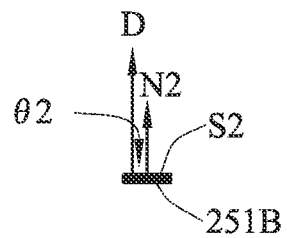
FIG. 7B shows schematically the second force sensor of FIG. 6B.

Refer now to FIG. 2A, FIG. 2B, FIG. 5A, FIG. 5B, FIG. 7A and FIG. 7B at the same time. In this embodiment, since each of the first force sensors 25A, 25A' and each of the second force sensors 25B, 25B', 25B'', 25B''' are the same as first force sensor 15A of the aforesaid embodiment, thus each of the first force sensors 25A, 25A' and each of the second force sensors 25B, 25B', 25B'', 25B''' can be represented by the sensor shown in FIG. 2A and FIG. 2B. The first force sensor 25A includes a first sensing element 251A which is represented by a first sensing element 151A shown in FIG. 2A and has a first sensing surface S1 shown in FIG. 7A. The second force sensor 25B includes a second sensing element 251B which is also represented by a first sensing element 151A shown in FIG. 2A and has a second sensing surface S2 shown in FIG. 7B. As shown in FIG. 7A and FIG. 7B, A first sensing angle θ1 is formed between a first normal vector N1 of the first sensing surface S1 of the first sensing element 251A and an axial direction D of the axis AX. In this embodiment, the first sensing angle θ1 can be substantially equal to −45° or +45°. Similar to the first embodiment, when the first sensing angle θ1 of this embodiment is substantially equal −45° or +45°, the first sensing element 251A would senses a maximum torsional strain. Therefore, when the first force sensor 25A measures the torsional force TZ, the measurement sensitivity can be improved. Since the first force sensor 25A' and the first force sensor 25A are identical thus details about the first force sensor 25A' would be omitted herein. In addition, as shown in FIG. 7B, a second sensing angle θ2 is formed between a second normal vector N2 of the second sensing surface S2 of the second sensing element 251B and the axial direction D of the axis AX. The first sensing angle θ1 is substantially not equal to the second sensing angle θ2. Similar to the first embodiment, the second sensing angle θ2 of this embodiment can be substantially equal to 0°. When a bending moment MX with respect to an axial direction X or a bending moment MY with respect to an axial direction Y applies to the tool holder 2 of this embodiment, the second sensing element 251B senses the maximum bending strain. Hence, while the second force sensor 25B measures the bending moment MX with respect to an axial direction X or the bending moment MY with respect to an axial direction Y, the measurement sensitivity can be effectively improved. Since the second force sensors 25B', 25B'', 25B''' and the second force sensor 25B are identical, thus details about 25B', 25B'', 25B''' would be omitted herein.

In summary, according to the aforesaid embodiments of the disclosure, the tool holder having force sensors has sensing portions with different stiffness and an active sensing mechanism. Thus, the first force sensors of the first sensing portion can sense the torsional force applied to the tool holder and minimize the interference induced by the bending force applied to the tool holder. Similarly, the second force sensors of the second sensing portion can sense the bending force applied to the tool holder and minimize the interference induced by the torsional force applied to the tool holder. In this disclosure, when the first force sensors measure the torsional force, the tool holder has sensing portions with different stiffness can minimize the ratio of bending strain to the first total strain measured by the first sensing elements. And when the second force sensors measure the bending force, the tool holder has sensing portions with different stiffness can minimize the ratio of the second torsional strain to the second total strain measured by the second sensing elements. Thereupon, according to the embodiments of the tool holder having force sensors in this disclosure, the coupling effect can be effectively reduced and the measurement accuracy of the first force sensors and the second force sensors can be improved when the tool holder measures torsional force and bending force simultaneously.

In addition, according to the embodiments of this disclosure, the direction of the sensing surface for each of the sensors of the tool holder having force sensors can be adjusted to the direction for the maximum torsional force or the direction for the maximum bending force. By this way, when each of the sensors measures the torsional force or bending force, the measurement sensitivity can be effectively increased.

Moreover, according to the embodiments of this disclosure, the sensors of the tool holder having force sensors are arranged symmetrically with respect to a point. The point symmetrical arrangement of force sensors enable the force sensors to effectively sense the multi-axial forces applied to the entire tool holder, such that the sensing performance of the sensors is improved.

Furthermore, according to the embodiments of this disclosure, the sensors of the tool holder having force sensors not only can directly display the measured torsional force and measured bending force on the displayer device, but also can transmit the measured data in real time through a wireless communication to the data management platform in the mobile device such as a tablet computer, a mobile phone or a notebook computer.

It can be seen that this disclosure has indeed achieved the effect of desired improvement under the breakthrough of the existing technology, and it is not obvious for those who are familiar with this skill to think about it. Its progressiveness and practicality have obviously met the requirements of the patent.

It will be apparent to those skilled in the art that various modifications and variations can be made to the disclosed embodiments without departing from the scope or spirit of the disclosure. It is intended that the specification and examples be considered as exemplars only, with a true scope of the disclosure being indicated by the following claims and their equivalents.

What is claimed is:

1. A tool holder having force sensors, comprising:
   a first connection portion connecting a cutting tool along an axis;
   a second connection portion being connected to a spindle along the axis;
   a first sensing portion having at least one first hole and connecting the first connection portion along the axis;
   a second sensing portion having at least one second hole and connecting the second connection portion and the first sensing portion along the axis;
   at least one first force sensor disposed in the at least one first hole and configured to sense a torsional force; and
   at least one second force sensor disposed in the at least one second hole and configured to sense a bending force;
   wherein a second bending stiffness of the second sensing portion is less than a first bending stiffness of the first sensing portion.

2. The tool holder having force sensors of claim 1, wherein a first torsional stiffness of the first sensing portion is less than a second torsional stiffness of the second sensing portion.

3. The tool holder having force sensors of claim 2, wherein the first sensing portion includes two first holes of the at least one first hole, the second sensing portion includes two second holes of the at least one second hole, a first line passes through the at least one first hole and the axis, and a second line passes through the at least one second hole and the axis.

4. The tool holder having force sensors of claim 3, wherein the second sensing portion further includes another two second holes of the at least one second hole, a third line passes through said another two second holes and the axis, and the second line and the third line are perpendicular to each other.

5. The tool holder having force sensors of claim 3, wherein the first sensing portion further includes a cross section, a normal vector is parallel to the axis, a projection angle is formed between a first projection of the first line on the cross section and a second projection of the second line on the cross section.

6. The tool holder having force sensors of claim 5, wherein the projection angle is substantially equal to −45° or +45°.

7. The tool holder having force sensors of claim 5, wherein the projection angle is substantially equal to −135° or +135°.

8. The tool holder having force sensors of claim 5, wherein the first force sensor includes a first sensing element having a first sensing surface, a first sensing angle is formed between a first normal vector of the first sensing surface and the axis, the second force sensor includes a second sensing element having a second sensing surface, a second sensing angle is formed between a second normal vector of the second sensing surface and the axis, the first sensing angle is substantially not equal to the second sensing angle.

9. The tool holder having force sensors of claim 8, wherein when the first force sensor is disposed in the at least one first hole, the first sensing angle is adjustable; and when the second force sensor is disposed in the at least one second hole, the second sensing angle is adjustable.

10. The tool holder having force sensors of claim 8, wherein the first sensing angle is substantially equal to −45° or +45°.

11. The tool holder having force sensors of claim 8, wherein the second sensing angle is substantially equal to 0° or 180°.

12. A tool holder having force sensors, comprising:
    a first connection portion connecting a cutting tool along an axis;
    a second connection portion being connected to a spindle along the axis;
    a first sensing portion having at least one first hole and connecting the first connection portion along the axis;
    a second sensing portion having at least one second hole and connecting the second connection portion and the first sensing portion along the axis;
    at least one first force sensor disposed in the at least one first hole and configured to sense a torsional force; and
    at least one second force sensor disposed in the at least one second hole and configured to sense a bending force;
    wherein a first torsional stiffness of the first sensing portion is less than a second torsional stiffness of the second sensing portion.

13. The tool holder having force sensors of claim 12, wherein the first force sensor includes a first sensing element having a first sensing surface, a first sensing angle is formed between a first normal vector of the first sensing surface and the axis, the second force sensor includes a second sensing element having a second sensing surface, a second sensing angle is formed between a second normal vector of the second sensing surface and the axis, the first sensing angle is substantially not equal to the second sensing angle.

14. The tool holder having force sensors of claim 13, wherein when the first force sensor is disposed in the at least one first hole and the first sensing angle is adjustable; and when the second force sensor is disposed in the at least one second hole and the second sensing angle is adjustable.

15. The tool holder having force sensors of claim 13, wherein the first sensing angle is substantially equal to −45° or +45°.

16. The tool holder having force sensors of claim 13, wherein the second sensing angle is substantially equal to 0° or 180°.

* * * * *